US008773986B2

(12) United States Patent
Dale et al.

(10) Patent No.: US 8,773,986 B2
(45) Date of Patent: Jul. 8, 2014

(54) UPSTREAM ADAPTIVE MODULATION IN A COMMUNICATIONS SYSTEM

(75) Inventors: Mark Dale, Laguna Hills, CA (US); David L. Hartman, Laguna Hills, CA (US); Dorothy D. Lin, Laguna Beach, CA (US); Rocco J. Brescia, Jr., Newport Coast, CA (US); Alan Gin, Corona Del Mar, CA (US); Ravi Bhaskaran, Irvine, CA (US); Jen-chieh Chien, Lake Forest, CA (US); Adel Fanous, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/980,137

(22) Filed: Dec. 28, 2010
(Under 37 CFR 1.47)

(65) Prior Publication Data

US 2011/0274151 A1   Nov. 10, 2011

Related U.S. Application Data

(63) Continuation of application No. 12/219,504, filed on Jul. 23, 2008, now Pat. No. 7,860,041, which is a continuation of application No. 10/352,251, filed on Jan. 28, 2003, now Pat. No. 7,408,892.

(51) Int. Cl.
*H04J 1/16* (2006.01)
*H04B 7/185* (2006.01)
*H04B 7/212* (2006.01)
*H04L 1/00* (2006.01)
*H04L 12/26* (2006.01)

(52) U.S. Cl.
CPC ................................ *H04B 7/18513* (2013.01)
USPC .......................................... 370/230; 375/223

(58) Field of Classification Search
CPC .................................................. H04B 7/18513
USPC .......... 370/265, 320, 342, 347, 335, 230, 316, 370/241; 375/223
See application file for complete search history.

(56) References Cited

U.S. PATENT DOCUMENTS 5,392,450 A   2/1995   Nossen
5,511,079 A   4/1996   Dillon (Continued)

OTHER PUBLICATIONS

Brown, Peter J., "Industry Players: Pushing Different Standards as Sector Enters New Phase," at http://telecomweb.com/cgi/pub/via/via05020504.html, 7 pages, May 2, 2005 (printed May 27, 2005).

(Continued)

*Primary Examiner* — Jung Park
*Assistant Examiner* — Albert Shih
(74) *Attorney, Agent, or Firm* — Sterne, Kessler, Goldstein & Fox P.L.L.C.

(57) ABSTRACT

A system and method for providing upstream adaptive modulation. Burst parameters associated with a range of data interval usage codes (IUCs) are defined. Each of the data IUCs has a different modulation order and forward error correction (FEC). The SNR and codeword error rate for each satellite modem in the network are monitored. The data IUCs are dynamically assigned to different satellite modems within an upstream channel based on SNR and/or codeword error rate to enable each of the satellite modems in the upstream channel to achieve maximum bandwidth efficiency during upstream data transmissions. Bandwidth requests are received from the satellite modems and granted. The grant includes the assigned data IUC. The data bursts received in the upstream channel are each processed using the parameters from the assigned IUC for each of the satellite modems sending data in the upstream channel. When any of the satellite modems' SNR and/or codeword error rate changes, the data IUC for that satellite modem is changed accordingly.

27 Claims, 6 Drawing Sheets

(56) References Cited

U.S. PATENT DOCUMENTS

| | | | |
|---|---|---|---|
| 5,625,624 A | 4/1997 | Rosen et al. | |
| 6,070,074 A | 5/2000 | Perahia et al. | |
| 6,108,317 A | 8/2000 | Jones et al. | |
| 6,108,561 A | 8/2000 | Mallinckrodt | |
| 6,169,728 B1 | 1/2001 | Perreault et al. | |
| 6,249,526 B1 | 6/2001 | Loukianov | |
| 6,330,278 B1 * | 12/2001 | Masters et al. | 375/223 |
| 6,411,806 B1 | 6/2002 | Garner et al. | |
| 6,459,703 B1 | 10/2002 | Grimwood et al. | |
| 6,542,484 B1 * | 4/2003 | Ovesjo et al. | 370/335 |
| 6,594,467 B2 | 7/2003 | Asia et al. | |
| 6,625,118 B1 | 9/2003 | Hadi Salim et al. | |
| 6,690,655 B1 | 2/2004 | Miner et al. | |
| 6,741,555 B1 | 5/2004 | Li et al. | |
| 6,742,187 B1 | 5/2004 | Vogel | |
| 6,785,252 B1 | 8/2004 | Zimmerman et al. | |
| 6,801,537 B1 | 10/2004 | Kubbar | |
| 6,804,532 B1 | 10/2004 | Moon et al. | |
| 6,807,193 B1 | 10/2004 | Beser | |
| 6,853,680 B1 | 2/2005 | Nikolich | |
| 6,987,741 B2 | 1/2006 | Kelly et al. | |
| 7,126,920 B2 * | 10/2006 | Venkatesulu et al. | 370/241 |
| 7,139,247 B2 | 11/2006 | Desai et al. | |
| 7,145,888 B2 | 12/2006 | Dale et al. | |
| 7,203,158 B2 | 4/2007 | Oshima et al. | |
| 7,408,892 B2 | 8/2008 | Dale et al. | |
| 7,860,041 B2 * | 12/2010 | Dale et al. | 370/316 |
| 2001/0038620 A1 | 11/2001 | Stanwood et al. | |
| 2002/0009051 A1 | 1/2002 | Cloonan | |
| 2002/0021678 A1 | 2/2002 | Heatwole et al. | |
| 2002/0021711 A1 | 2/2002 | Gummalla et al. | |
| 2002/0031120 A1 | 3/2002 | Rakib | |
| 2002/0036985 A1 | 3/2002 | Jonas et al. | |
| 2002/0061753 A1 | 5/2002 | Lysejko et al. | |
| 2002/0073432 A1 | 6/2002 | Kolze | |
| 2002/0080816 A1 | 6/2002 | Spinar et al. | |
| 2002/0154620 A1 * | 10/2002 | Azenkot et al. | 370/347 |
| 2003/0021240 A1 * | 1/2003 | Moon et al. | 370/320 |
| 2003/0021365 A1 | 1/2003 | Min et al. | |
| 2003/0026283 A1 | 2/2003 | Currivan et al. | |
| 2003/0058794 A1 | 3/2003 | Pantelias et al. | |
| 2003/0069926 A1 | 4/2003 | Weaver et al. | |
| 2003/0072292 A1 * | 4/2003 | Yoon et al. | 370/342 |
| 2003/0128769 A1 * | 7/2003 | Kim et al. | 375/265 |
| 2003/0147411 A1 | 8/2003 | Goosman | |
| 2004/0017830 A1 | 1/2004 | Dale et al. | |
| 2004/0162020 A1 | 8/2004 | Dale et al. | |
| 2007/0147281 A1 | 6/2007 | Dale et al. | |

OTHER PUBLICATIONS

Data-Over-Cable Service Interface Specifications, Radio Frequency Interface Specification (SP-RFIv1.-I09-020830), Cable Television Laboratories, Inc., © 1999-2002.

Digital Video Broadcasting (DVB); Interaction Channel for Satellite Distribution Systems, ETSI EN 301 790 v1.2.2 (Dec. 2000) European Telecommunications Standards Institute, European Broadcasting Union, 2000.

* cited by examiner

UPSTREAM ADAPTIVE MODULATION IN A COMMUNICATIONS SYSTEM

CROSS REFERENCE TO RELATED APPLICATIONS

This application is a continuation of U.S. patent application Ser. No. 12/219,504, now U.S. Pat. No. 7,860,041, filed on Jul. 23, 2008, titled "Upstream Adaptive Modulation in a Communications System," which is a continuation of U.S. patent application Ser. No. 10/352,251, now U.S. Pat. No. 7,408,892, filed on Jan. 28, 2003, titled "Upstream Adaptive Modulation in DOCSIS Based Applications," both of which are incorporated herein by reference in their entirety.

BACKGROUND OF THE INVENTION

1. Field of the Invention

The present invention is generally related to broadband communications systems. More particularly, the present invention is related to broadband communications systems that use Data Over Cable Service Interface Specification (DOCSIS) or any of its derivatives.

2. Background Art

In DOCSIS related broadband communications architectures, data is transferred between a central location and many remote subscribers. The central location may be referred to as a headend for cable systems, a wireless access termination system (WATS) for broadband terrestrial fixed wireless systems, or a satellite gateway for two-way satellite systems. Subscriber equipment may be referred to as a cable modem (CM) for cable systems, a wireless modem (WM) for broadband terrestrial fixed wireless systems, or a satellite modem (SM) for two-way satellite systems.

BACKGROUND ART

In a two-way satellite system, the communication path from the satellite gateway to the SM is called the downstream and the communication path from the SM to the satellite gateway is called the upstream. In standard DOCSIS based systems, the upstream is implemented in a time division multiple access (TDMA) protocol with a fixed modulation type and forward error correction (FEC) coding rate. Such signals have a fixed spectral efficiency in bits per second/Hertz (bps/Hz). Signal parameters such as modulation type, FEC coding type, and FEC coding rate determine the signal-to-noise ratio (SNR) required for the SM to have error-free or quasi error-free operation in a given channel. There is an inherent trade-off between receiver parameters that allow for high throughput (high order modulation, high FEC code rates) and those that allow the signal to be reliably received at low SNRs, but with a lower throughput (low order modulations, robust low code rate FECs).

In many real world environments, subscribers experience a wide range of path losses and channel degradations. For example, in the case of a satellite based system where a downstream spot beam is broadcasting to SMs that are located over a wide geographic area, various degradations, such as localized rainfall, partial obstructions, antenna misalignments, etc., cause the upstream signal power levels and SNRs received at the satellite gateway from individual subscribers to vary significantly. Terrestrial wireless and cable systems may experience the same phenomenon for different reasons.

Current DOCSIS based systems operate with parameters that allow the worst case subscriber to obtain service with a given probability of success. Subscribers that could otherwise transmit upstream data at a higher rate are penalized by the presence of disadvantaged subscribers.

Thus, what is needed is a system and method of dynamically assigning data traffic with different modulation orders and FEC parameters to different SMs within the same upstream channel, referred to as "upstream adaptive modulation (US-AM)." What is also needed is a system and method that implements US-AM in a manner that enables non US-AM enabled SMs to efficiently continue operation

BRIEF SUMMARY OF THE INVENTION

The present invention solves the above-mentioned problems by providing a system and method for dynamically assigning data traffic with different modulation orders and FEC parameters to different satellite modems (SMs) within the same upstream channel. As previously stated, this is also referred to as upstream adaptive modulation. The present invention accomplishes this by extending existing DOCSIS mechanisms for requesting bandwidth and defining data burst parameters. The extensions allow the satellite gateway to instruct each individual SM to use burst parameters that achieve the maximum bandwidth efficiency possible under the constraints of the system capabilities, channel conditions and requirements on received signal quality metrics. This results in a combination of improved channel capacity, increased throughput, and improved coverage.

Briefly stated, the present invention is directed to a system and method for providing upstream adaptive modulation. Burst parameters associated with a range of data interval usage codes (IUCs) are defined. Each of the data IUCs has a different modulation order and forward error correction (FEC). The SNR and codeword error rate for each satellite modem in the network are monitored. The data IUCs are dynamically assigned to different satellite modems within an upstream channel based on SNR and/or codeword error rate to enable each of the satellite modems in the upstream channel to achieve maximum bandwidth efficiency during upstream data transmissions. Bandwidth requests are received from the satellite modems and granted. The grant includes the assigned data IUC. The data bursts received in the upstream channel are each processed using the parameters from the assigned IUC for each of the satellite modems sending data in the upstream channel. When any of the satellite modems' SNR and/or codeword error rate changes, the data IUC for that satellite modem is changed accordingly.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention.

Figure 1:
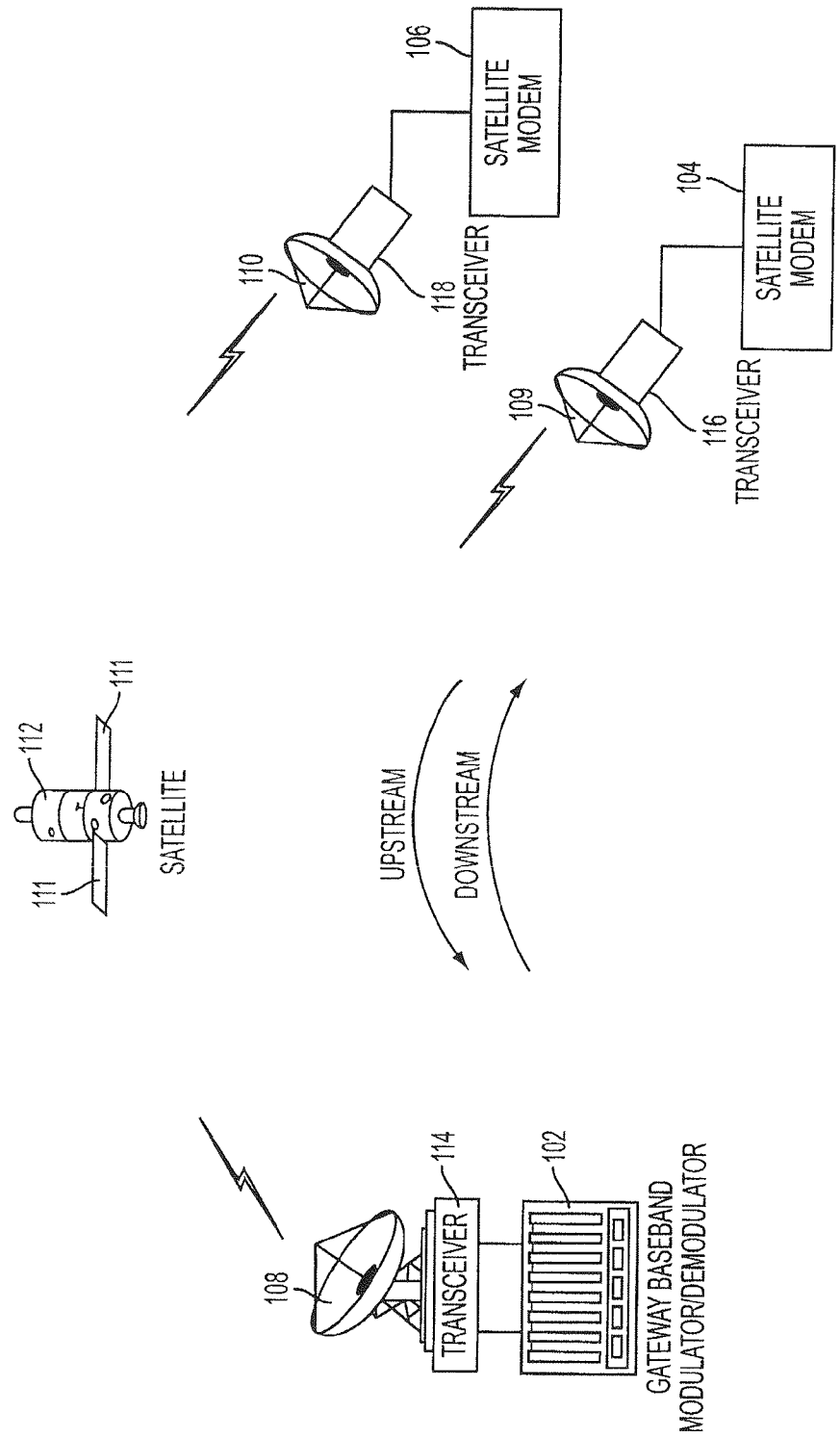
FIG. 1 is a high level block diagram of an exemplary broadband two-way satellite communications system in accordance with embodiments of the present invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art(s) with access to the teachings provided herein will recognize additional modifications, applications, and embodiments within the scope thereof and additional fields in which the present invention would be of significant utility.

Overview

FIG. 1 is a high level block diagram of an exemplary broadband two-way satellite communications system 100 in accordance with embodiments of the present invention. Although the present invention is described using a broadband two-way satellite communications system, the present invention is also applicable to other broadband communications systems. Such systems may include, but are not limited to, broadband cable systems and broadband terrestrial fixed wireless systems. Broadband two-way satellite communications system 100 enables voice communications, video and data services based on a bi-directional transfer of packet-based traffic between a satellite gateway 102 and one or more satellite modems (SM), such as satellite modems 104 and 106, via a satellite 112. Satellite 112 is a vehicle or platform designed to orbit the earth. Satellite 112 contains electronic devices for originating and/or relaying telecommunications, data, etc. between satellite gateway 102 and one or more satellite modems, such as SMs 104 and 106. For example, in an embodiment of the present invention, satellite 112 receives packet-based traffic from satellite gateway 102 and relays such traffic to one or more satellite modems, such as satellite modems 104 and 106. Satellite 112 also receives packet-based traffic from satellite modems, such as satellite modems 104 and 106, and sends such traffic to satellite gateway 102. Although broadband two-way satellite communications system 100 is shown with only two satellite modems, any number of satellite modems may be included in the broadband two-way satellite communications system 100 of the present invention.

Bi-directional transfer of packet-based traffic is achieved using antennas, such as antennas 108, 109, 110, and 111, and transceivers 114, 116 and 118. Satellite 112 is coupled to antennas 111 for receiving and transmitting information. Antenna 108 is coupled to satellite gateway 102 via transceiver 114 for transmitting/receiving packet-based traffic to/from SMs 104 and 106, respectively, via satellite 112. Antennas 109 and 110 are coupled to SMs 104 and 106 via transceivers 116 and 118, respectively, for transmitting/receiving packet-based traffic to/from satellite gateway 102, via satellite 112. The communication path from satellite gateway 102 to satellite modems 104 and 106 is called the downstream. The communication path from satellite modems 104 and 106 to satellite gateway 102 is called the upstream.

Satellite gateway 102 is a central distribution point for broadband two-way satellite communications system 100. Satellite gateway 102 manages the upstream and downstream transfer of data between satellite gateway 102 and satellite modems, such as satellite modems 104 and 106, via satellite 112. Satellite gateway 102 broadcasts information downstream to satellite modems 104 and 106 as a continuous transmitted signal in accordance with a time division multiplexing (TDM) technique. Satellite gateway 102 also controls the upstream transmission of data from satellite modems 104 and 106 to satellite gateway 102 by assigning to each satellite modem (104 and 106) slots within which to transfer data in accordance with a time domain multiple access (TDMA) technique. Thus, each satellite modem (104 and 106) sends information upstream as short burst signals during a transmission opportunity allocated by satellite gateway 102.

Each of satellite modems 104 and 106 operates as an interface to a user device (not shown). User devices may include, but are not limited to, personal computers, data terminal equipment, telephony devices, broadband media players, personal digital assistants, network-controlled appliances, or any other device capable of transmitting or receiving data. Satellite modems 104 and 106 perform the functions necessary to convert downstream signals received over broadband two-way satellite communications system 100 into data packets for receipt by an attached user device. Satellite modems 104 and 106 perform the functions necessary to convert data signals received from the user devices into upstream burst signals suitable for transfer over broadband two-way satellite communications system 100.

In exemplary broadband two-way satellite communications system 100, satellite modems 104 and 106 operate in formats that adhere to the protocols set forth in the DOCSIS specification as well as proprietary protocols that extend beyond the DOCSIS specification. Additionally, satellite gateway 102 operates to transmit, receive and process data transmitted to it in accordance with the protocols set forth in the DOCSIS specification and can also operate to transmit, receive and process data packets that are formatted using proprietary protocols that extend beyond those provided by the DOCSIS specification. The manner in which satellite modems 104 and 106 operate to transmit data will be described in further detail herein. The manner in which satellite gateway 102 operates to receive and process data will also be described in further detail herein. The following description will now concentrate on the upstream transfer of data from satellite modems 104 and 106 to satellite gateway 102, via satellite 112.

In DOCSIS based systems, the upstream traffic flow of a given SM (104/106) is assigned one or more service IDs (SIDs) by satellite gateway 102. Many SMs share an upstream channel by transmitting bursts within assigned burst times for a given SM (104/106). Burst times are assigned by a MAP message sent in the downstream. Each burst interval assigned in the MAP message has an associated SID that identifies the upstream traffic flow of a given SM (104/106) and an Interval Usage Code (IUC) that identifies the burst type.

In the DOCSIS protocol, several well known IUC numbers are associated with various defined burst types. An IUC=1 is defined as a request access (RA) burst. An IUC=2 is defined as a request/data burst. An IUC=3 is defined as an initial maintenance. An IUC=4 is defined as a station maintenance. An IUC=5 is defined as a short data burst for standard DOCSIS. An IUC=6 is defined as a long data burst for standard DOCSIS. An IUC=9 is defined as a short data burst for an advanced physical layer (PHY) version of standard DOCSIS. And an IUC=10 is defined as a long data burst for an advanced physical layer (PHY) version of standard DOCSIS. There are also several reserved IUCs for future use as other data types.

The parameters associated with different IUCs are defined at the Gateway and communicated to the SM by means of an upstream channel descriptor (UCD) message. UCD messages are sent periodically in the downstream direction from satellite gateway 102 to the SM (104/106). For satellite applications, UCD messages must be modified to properly describe satellite upstream channel parameters. Modifications include, but are not limited to, adding parameters describing the inner code rate, turbo (or other inner code) block size, number of tailing symbols in a inner code word, etc., all of which are well known to those skilled in the relevant art(s). Implementation of the present invention assumes that the UCDs have been properly modified to describe the relevant satellite upstream parameters.

In standard-DOCSIS, data is both requested and granted in terms of mini-slots. In standard DOCSIS, a mini-slot is defined as a factor of two multiple of 6.25 microseconds. The factor used (and hence the mini-slot time duration) is programmable and can vary in different realizations. When a SM transmits data, the selection of a short vs. long data burst type is determined solely by the length of the grant in mini-slots. If the number of granted mini-slots exceeds a programmable threshold, a long data burst type is used. If the grant does not exceed this threshold, a short data burst type is used. This threshold is defined at satellite gateway 102 and communicated to SMs (104/106) as part of the UCD message. Thus, with standard DOCSIS, only two data burst types, short and long, are used by SMs, such as SMs 104 and 106, to transmit data upstream.

Transmission of an Upstream Data Packet Using Standard DOCSIS

Figure 2:
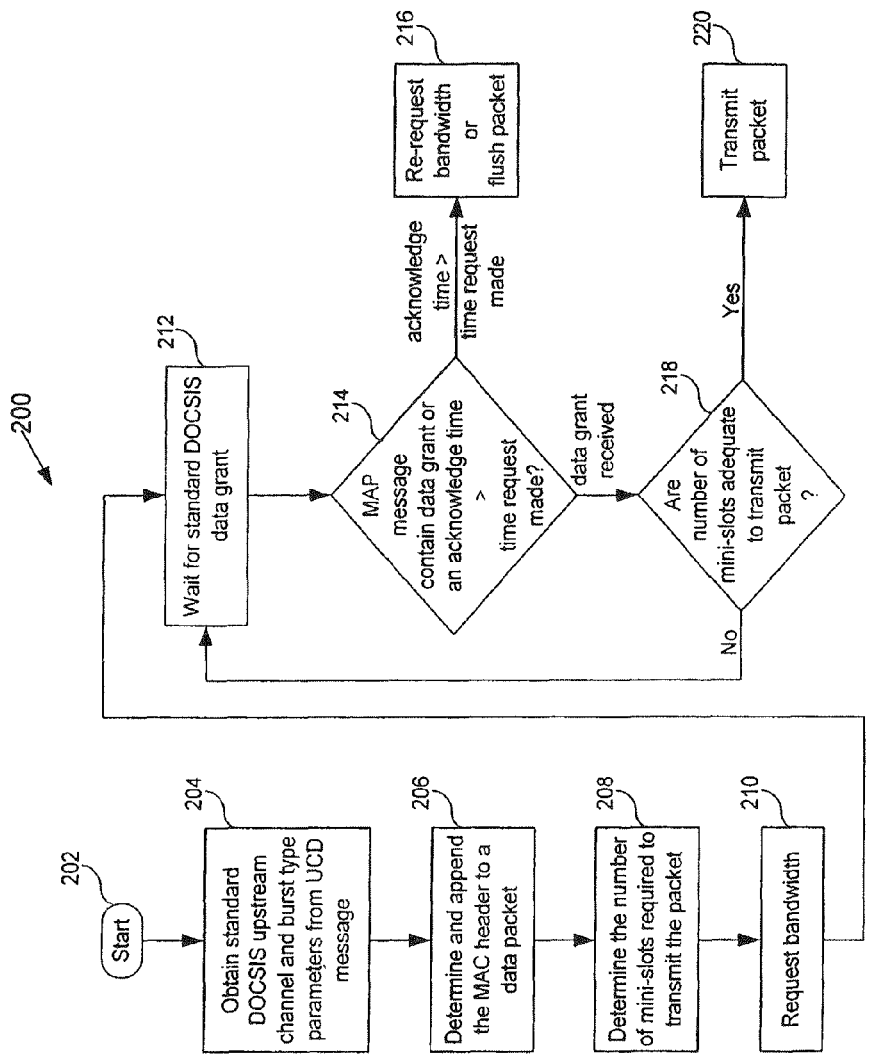
FIG. 2 is a simplified flow diagram of a standard DOCSIS process for the transmission of an upstream data packet from the perspective of a satellite modem.

FIG. 2 is a simplified flow diagram of the current standard-DOCSIS process for the transmission of an upstream data packet from the perspective of a satellite modem. To more clearly illustrate contrasting mechanisms between the current process and the present invention, details of the DOCSIS error recovery mechanisms are omitted. Also, DOCSIS features such as fragmentation and unsolicited grant service (UGS) are not enabled. The process begins with step 202, where the process immediately proceeds to step 204.

In step 204, the satellite modem (104/106) receives upstream channel and burst type parameters from an upstream channel descriptor message and registers with the network prior to initializing any data transfer. Upstream data transfer is initialized when an Ethernet frame is input to the satellite modem (104/106) from the customer premises equipment (CPE). CPE is equipment at the end user's premises, which may be provided by an end user or a service provider. The process then proceeds to step 206.

In step 206, the satellite modem (104/106) determines the media access control (MAC) header and appends the MAC header to the data packet that is to be transmitted. The satellite modem (104/106) has knowledge of the total number of bytes (Ethernet bytes plus DOCSIS header overhead) that are to be transmitted. The process then proceeds to step 208.

In step 208, the satellite modem (104/106) determines the number of mini-slots required to transmit the data packet. The satellite modem (104/106) calculates the number of mini-slots required as a function of (1) the number of bytes to be transmitted; (2) the mini-slot size; (3) the symbol rate; (4) the coding and modulation parameters to be used; and (5) burst overhead parameters such as preamble length and guard time. Implicit in this calculation is the knowledge of whether the short data or long data parameters are to be used. As was indicated previously, in standard DOCSIS this determination is made solely on whether the number of mini-slots in the request is above or below a programmable threshold. Both the satellite gateway (102) and satellite modem (104/106) are aware of this threshold. In an alternative embodiment, the satellite modem (104/106) may use a precalculated look up table to determine the number of mini-slots required to transmit the data packet. The process then proceeds to step 210.

In step 210, the satellite modem (104/106) makes a bandwidth request for the proper number of mini-slots. This request can be made in a number of ways. For example, the request can be made in a multi-cast request access burst slot, in a uni/cast request access burst slot, as part of a piggyback request made from a previously granted data burst, in a bandwidth request field of a modified range request, or in some other manner to be defined in the future. The satellite modem (104/106) records the time that the request was made. The process then proceeds to step 212.

In step 212, the satellite modem (104/106) waits for a data grant to be received in a MAP message associated with the upstream being used. The satellite modem (104/106) may perform other tasks unrelated to the processing of the data packet during the wait period. The satellite modem (104/106) will wait until either: (a) it receives a MAP message indicating a data grant; or (b) it receives a MAP message where the acknowledge time is greater than the time of the request. The process then proceeds to decision step 214.

In decision step 214, it is determined whether the satellite modem (104/106) has received a data grant or an acknowledge time that is greater than the time in which the request was made. If it is determined that the satellite modem (104/106) has received an acknowledge time that is greater than the time in which the request was made without first receiving a data grant, then the satellite gateway (102) was unable to grant the bandwidth request for the satellite modem (104/106). This may occur for a variety of reasons which are well known to those skilled in the relevant art(s). The process then proceeds to step 216.

In step 216, the satellite modem (104/106) may request the bandwidth again, flush the packet, or perform other error recovery mechanisms.

Returning to decision step 214, if it is determined that the satellite modem (104/106) received a data grant, the process proceeds to decision step 218.

In decision step 218, it is determined whether the number of mini-slots in the grant are adequate to transmit the data packet. If it is determined that the number of mini-slots are inadequate, and fragmentation is not enabled, the grant is unused and the process proceeds back to step 212, where the satellite modem (104/106) waits for another standard DOCSIS data grant.

Returning to decision step 218, if it is determined that the number of mini-slots granted are adequate to transmit the data packet, the process then proceeds to step 220.

In step 220, the data packet is transmitted to the gateway (102) in the proper burst interval and processing of the packet by the satellite modem (104/106) is completed.

Figure 3:
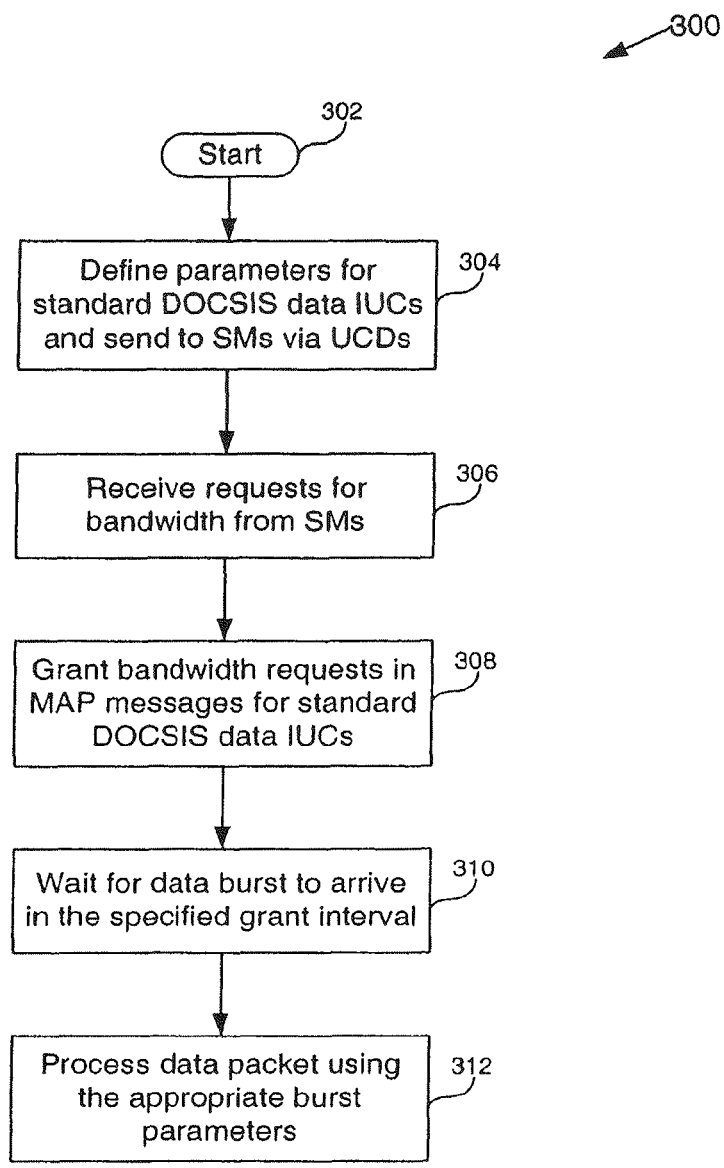
FIG. 3 is a simplified flow diagram of a standard DOCSIS process for the transmission of an upstream data packet from the perspective of a satellite gateway.

FIG. 3 is a simplified flow diagram of a standard DOCSIS process for the transmission of an upstream data packet from the perspective of a satellite gateway (102). The process begins with step 302 and immediately proceeds to step 304.

In step 304, the satellite gateway (102) defines parameters for standard DOCSIS data IUCs and sends these parameters to the satellite modems (104 and 106) via an upstream channel descriptor (UCD). The process then proceeds to step 306.

In step 306, the satellite gateway (102) receives a request for bandwidth from a given satellite modem (104/106). This request is referenced to a known SID of the satellite modem (104/106), and is in units of mini-slots. The process then proceeds to step 308.

In step 308, the satellite gateway 102 grants the request in the appropriate MAP message. The grant in the MAP message contains the SID, the offset, and the IUC of the grant. The start time and duration of the grant are inferred from the start time of the overall map and the offset of the other grants in the MAP message. The IUC for the data packet corresponds to either a long or short burst type IUC for data depending on the number of mini-slots in the grant. The process then proceeds to step 310.

In step 310, the satellite gateway (102) then waits for the data burst to arrive in the specified grant interval. The process then proceeds to step 312.

In step 312, the gateway (102) processes the received burst using parameters appropriate for either long or short data depending on the type of burst used.

In the previous description of the transmission process, for a given size data burst there is no mechanism that enables different satellite modems to use different burst parameters such as coding rate or modulation type. With the standard or advanced physical layer version of DOCSIS, there are only two IUCs for transmitting data. The two IUCs are associated with short and long data, respectively. The parameters associated with short and long data are based on mini-slot size only. Thus, the burst parameters are fixed for a given upstream configuration, requiring all satellite modems to operate at the same bandwidth efficiency.

Upstream Adaptive Modulation

The present invention implements adaptive modulation by dynamically assigning data traffic with different modulation orders and FEC parameters to different satellite modems (SMs) within the same upstream channel. The present invention accomplishes this by extending existing DOCSIS mechanisms for requesting bandwidth and defining data burst parameters. The extensions allow the satellite gateway to instruct each individual SM to use burst parameters that achieve the maximum bandwidth efficiency possible under the constraints of the system capabilities, channel conditions and requirements on received signal quality metrics. This results in a combination of improved channel capacity, increased throughput, and improved coverage.

The present invention extends the concept of data burst transmissions based solely on short and long data. Instead, the present uses a plurality of IUCs for transmitting data. Each IUC has associated with it a plurality of parameters that achieve different bandwidth efficiencies. Upon receiving a request for bandwidth from a SM, the satellite gateway will assign an IUC to the SM based on the SM's SNR, codeword error rate, etc, to enable the SM to achieve the maximum bandwidth efficiency possible for that individual SM. This enables different satellite modems within the same upstream channel to have different modulation orders and FEC parameters.

Figure 4:
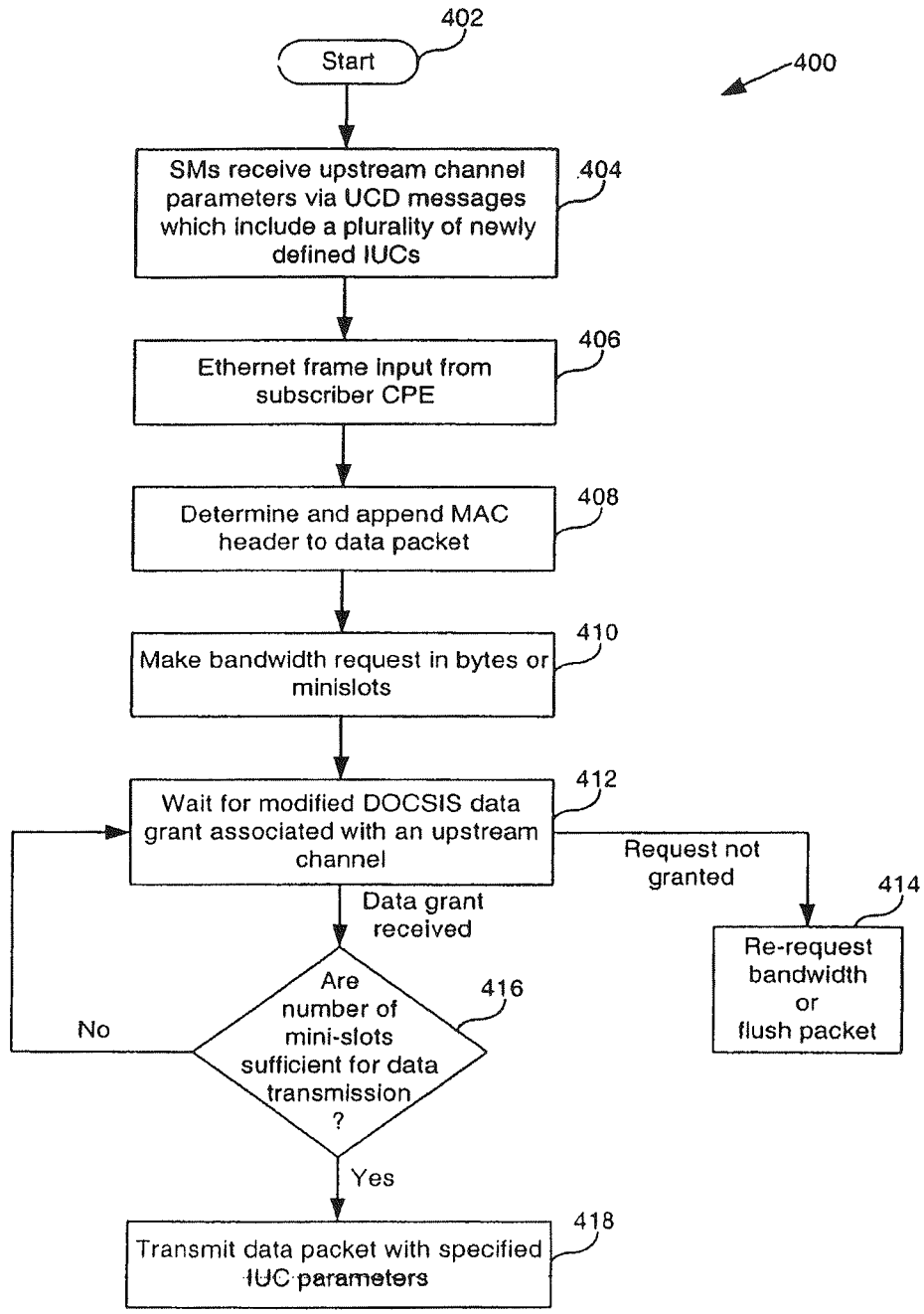
FIG. 4 is a flow diagram of a modified DOCSIS process for the transmission of an upstream data packet from the perspective of a satellite modem according to an embodiment of the present invention.

FIG. 4 is a flow diagram 400 of a modified DOCSIS process for the transmission of an upstream data packet from the perspective of a satellite modem according to an embodiment of the present invention. The invention is not limited to the description provided herein with respect to flow diagram 400. Rather it would be apparent to person(s) skilled in the relevant art after reading the teachings provided herein that other functional flow diagrams are within the scope of the present invention. The process begins with step 402, where the process immediate proceeds to step 404.

In step 404, prior to initializing any data transfer, the satellite modem (104/106) receives upstream channel parameters via the upstream channel descriptor messages. The present invention requires that a plurality of data IUCs be defined. Different data IUCs are assigned unique parameter sets. A key objective of the parameter set definition is to obtain operating points spaced over a desired range.

Figure 5:
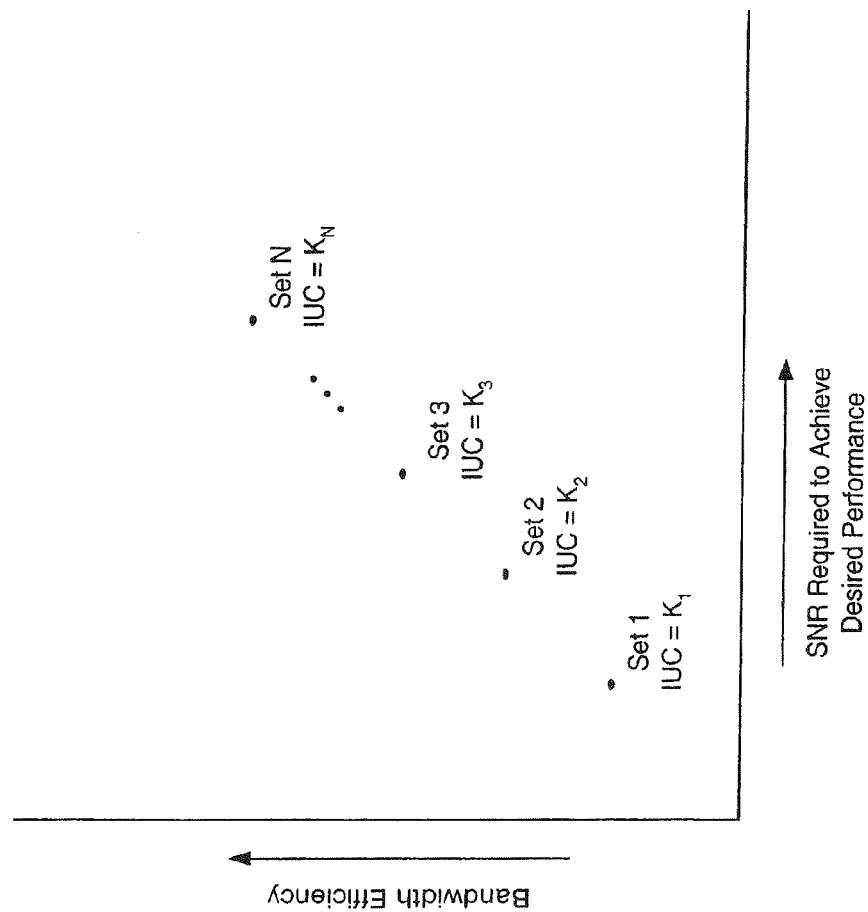
FIG. 5 is a graph illustrating upstream operating points associated with upstream adaptive modulation IUCs according to an embodiment of the present invention.

FIG. 5 is a graph illustrating upstream operating points associated with upstream adaptive modulation IUCs according to an embodiment of the present invention. FIG. 5 shows a plurality of predefined parameter sets for each newly defined set of IUCs spaced over a desired range of operating points. For example, parameter set 1 for IUC=K1 requires a very small SNR to be able to operate without errors, but the bandwidth efficiency is low. Parameter set N for IUC=KN has a very high bandwidth efficiency, but requires a very high SNR to be able to operate without errors. Important parameters that set bandwidth efficiency and determine signal to noise ratio requirements include, but are not limited to, modulation type, inner code rate, outer code rate (or equivalently outer code Reed-Solomon k and T values), inner code block size, and inner code tailing symbols (flush symbols). Each parameter set shown in FIG. 5 includes a set of these important parameters. One skilled in the relevant art(s) would know that other parameters may also be used in defining the parameter sets for each unique IUC. Note in particular that different IUCs can still be defined for short and long data bursts.

Thus for the present invention, the upstream transmission of data is not based solely on two IUCs for short and long data bursts, respectively. To the contrary, the upstream transmission of data is based on a plurality of newly defined IUCs having unique parameter sets that provide the capability for each individual SM transmitting on a single upstream channel to use burst parameters that achieve the maximum bandwidth efficiency possible for each SM. This enables the use of higher code rates, thereby reducing the amount of mini-slots granted. With each SM being able to transmit data based on its own capabilities rather than the capabilities of the worst case SM, improved channel capacity, higher throughput and improved coverage results. Also, when conditions change for any one SM, such as, for example, a decrease in SNR resulting from a rain storm or the like, the system adapts by assigning that SM a different IUC that accommodates for the decrease in SNR.

Returning to FIG. 4, the process then proceeds to step 406. In step 406, upstream data transfer is initiated when an ethernet frame is input to the satellite modem from the CPE. The process then proceeds to step 408.

In step 408, the satellite modem (104/106) determines and appends the MAC header that is to be transmitted along with the packet. The satellite modem (104/106) has knowledge of the total number of bytes (ethernet bytes plus DOCSIS header overhead) that are to be transmitted upstream.

In step 410, the satellite modem (104/106) makes a bandwidth request directly for the appropriate number of bytes (i.e., the units of the request are in bytes and not mini-slots). Alternatively, the satellite modem (104/106) may request bandwidth in mini-slots using parameters associated with some fixed and pre-defined IUC. The satellite gateway (102) would then use knowledge of the parameters of this IUC to determine the number of bytes requested, thus, obtaining the equivalent information. As in the standard DOCSIS case, the bandwidth request may be made in a multi-cast request access burst slot, in a uni-cast request access burst slot, as part of a piggyback request made in a data burst, in a bandwidth request field of a modified range request, or in some other manner to be determined at a future time. The satellite modem (104/106) makes note of the time that the request was made. The process then proceeds to step 412.

In step 412, the satellite modem (104/106) waits for a data grant to be received in a map message associated with the upstream being used. The satellite modem (104/106) realizes that it may be granted a slot on any of the defined data IUCs. As in standard DOCSIS, the grant in the map is defined in mini-slots. The satellite modem (104/106) will exit the wait state when it receives: (a) a data grant for any one of the data IUCs; or (b) a map message where the acknowledge time in the map is greater than the time of the request. If the acknowledgment time in the map message is greater than the request time, a request is not granted and the process proceeds to step 414.

In step 414, the satellite gateway (102) is not able to grant the satellite modem's bandwidth request. This may occur for a variety of reasons, which are well known to those skilled in the relevant art(s). At this time, the satellite modem (104/106) may request bandwidth again, flush the packet, or perform other error recovery mechanisms.

Returning to step 412, if a data grant is received, the process then proceeds to decision step 416. In decision step 416, the satellite modem (104/106) checks the grant to ensure that the number of mini-slots is adequate to transmit the package. There are several possible data grant IUCs, and a required number of mini-slots is potentially different for each IUC type. Hence, this calculation or result from a lookup table must consider the IUC of the data grant. If the number of mini-slots is not adequate and fragmentation is not enabled, the grant is unused and the satellite modem returns to the wait state in step 412.

Returning to decision step 416, if the data grant contains the necessary number of mini-slots, the process proceeds to step 418.

In step 418, the data packet is transmitted to the satellite gateway (102) using the burst parameters associated with the IUC granted by the satellite gateway (102). The satellite modem processing of this packet is now complete.

Figure 6:
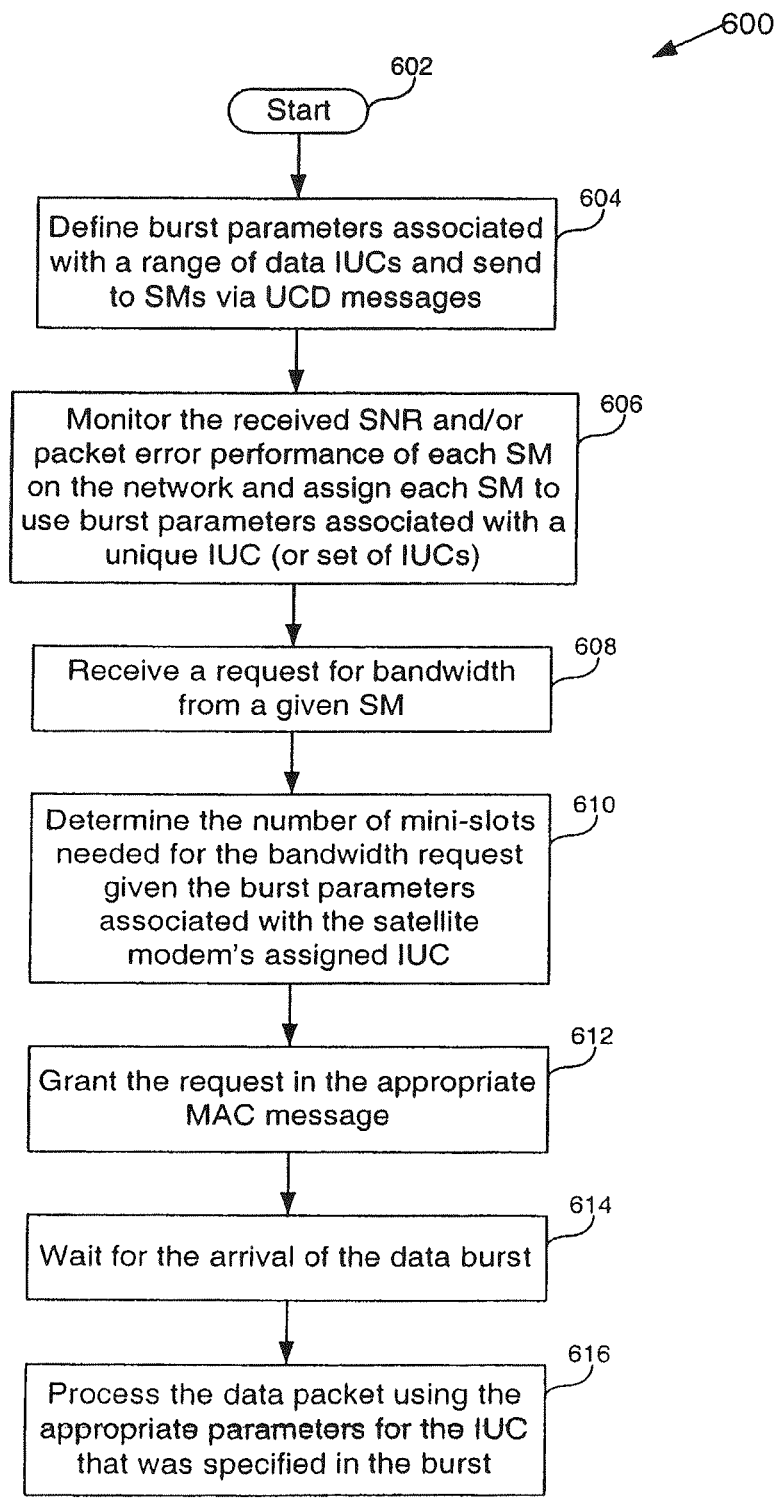
FIG. 6 is a flow diagram of a modified DOCSIS process for the transmission of an upstream data packet from the perspective of a satellite gateway according to an embodiment of the present invention.

FIG. 6 is a flow diagram 600 of a modified DOCSIS process for the transmission of an upstream data packet from the perspective of a satellite gateway according to an embodiment of the present invention. The invention is not limited to the description provided herein with respect to flow diagram 600. Rather it would be apparent to person(s) skilled in the relevant art after reading the teachings provided herein that other functional flow diagrams are within the scope of the present invention. The process begins with step 602, where the process immediate proceeds to step 604.

In step 604, prior to the start of processing, the satellite gateway (102) defines burst parameters associated with a range of data IUCs. As previously stated, each defined IUC is associated with a unique parameter set that includes modulation type, FEC coding type, and FEC coding rate. The burst parameter definitions of the data IUCs are sent to the satellite modems (104/106) via UCD messages. The process then proceeds to step 606.

In step 606, as part of the registration process, and as an ongoing task, the satellite gateway (102) monitors the received SNR and/or packet error performance of each SM (104/106) on the network and assigns each SM (104/106) to use burst parameters associated with a unique IUC. This assignment can vary over time as the received SNR, packet error rate performance, or other metrics from a given SM vary. For example, if the SNR for a SM goes down, possibly due to rain or other bad weather conditions, and the satellite gateway starts seeing errors, then the satellite gateway will drop the SM (104/106) down to a lower IUC or an IUC that requires a lower SNR. When the SM's SNR and codeword error rate begin to improve, the satellite gateway (102) will bump the SM (104/106) up to a higher IUC, accordingly. The process then proceeds to step 608.

In step 608, the satellite gateway (102) receives a request for bandwidth from a given satellite modem (104/106). This request is referenced to a known SID assigned to the satellite modem (104/106), and is in units of bytes. The process then proceeds to step 610.

In step 610, the gateway calculates the number of mini-slots necessary for the bandwidth request given the burst parameters associated with the satellite modem's assigned IUC. Note that a higher SNR requires fewer mini-slots to be granted. A lower SNR requires more mini-slots to be granted. Thus, with the present invention, the satellite gateway (102) is granting fewer mini-slots by assigning IUCs based on SNR and codeword error rate. Alternatively, the satellite gateway (102) may utilize a precalculated lookup table to determine the number of mini-slots. The process then proceeds to step 612.

In step 612, the satellite gateway (102) grants the request in the appropriate MAC message. The MAC message is in the standard DOCSIS format. The SID and IUC of the grant is specified, along with offset information by which to infer the number of mini-slots of the grant. The process then proceeds to step 614 where the gateway waits for the data burst to arrive in the specified grant interval. The process then proceeds to step 616.

In step 616, the gateway (102) processes the received burst using parameters appropriate for the IUC that it specified in the burst. Thus, the present invention implements upstream adaptive modulation within the context of a DOCSIS-based satellite or other system. It allows each satellite modem to individually be assigned burst parameters that optimize the SM's bandwidth efficiency given the SM's operational environment.

CONCLUSION

The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A method for use in a communications system, the communications system including a plurality of first communication devices communicatively coupled to a second communication device via a single channel, the single channel being configured to allow transmission of data from the plurality of first communication devices to the second communication device using different data codes from among a plurality of data codes, comprising:

monitoring, by the second communication device, first and second characteristics respectively associated with first and second devices from among the plurality of first communication devices;

assigning, by the second communication device, first and second data codes, from among the plurality of data codes to the first and the second devices according to the first and the second characteristics, the first and the second data codes being different with respect to each other and being respectively associated with first and second parameters;

receiving, by the second communication device, a first data transmission over the single channel from the first device in accordance with the first parameter and a second data transmission over the single channel from the second device in accordance with the second parameter; and updating, by the second communication device, the first data code with a third data code from among the plurality of data codes when a variation is detected in the first characteristic.

2. The method of claim 1, wherein the monitoring the first and the second characteristics comprises:

monitoring a signal-to-noise ratio (SNR) or a codeword error rate.

3. The method of claim 1, further comprising:
receiving a bandwidth request from the first device;
granting the bandwidth request, the granted bandwidth being associated with the first data code;
receiving the first data transmission from the first device, the first data transmission being in accordance with the first parameter associated with the first data code; and
processing the first data transmission using the first parameter associated with the first data code.

4. The method of claim 3, wherein the receiving the first data transmission comprises:
receiving the first data transmission in accordance with the first parameter that is independent of the second parameter of the second data transmission received from the second device.

5. The method of claim 3, further comprising: determining, based on the first parameter, a number of mini-slots needed prior to the granting.

6. The method of claim 1, wherein the assigning comprises:
assigning a modulation order and a forward error correction (FEC) parameter associated with the single channel as the first data code.

7. The method of claim 1, wherein the assigning comprises:
assigning the first data code from among data interval usage codes (IUCs) used in accordance with a Data Over Cable Service Interface Specification (DOCSIS).

8. The method of claim 1, further comprising:
defining the first and the second parameters to be associated with a plurality of data interval usage codes (IUCs).

9. A communications system, comprising:
a second communication device communicatively coupled to a plurality of first communication devices via a single channel, the single channel being configured to allow transmission of data from the plurality of first communication devices to the second communication device using different data codes from among a plurality of data codes, the second communication device being configured to:

monitor first and second characteristics respectively associated with first and second devices from among the plurality of first communication devices;

assign first and second data codes from among the plurality of data codes to the first and the second devices according to the first and the second characteristics, the first and the second data codes being different with respect to each other and being respectively associated with first and second parameters:

receive a first data transmission over the single channel from the first device in accordance with the first parameter and a second data transmission over the single channel from the second device in accordance with the second parameter; and update the first data code with a third data code from among the plurality of data codes when a variation is detected in the first characteristic.

10. The communications system of claim 9, wherein the single channel is an upstream channel 11. The communications system of claim 9, wherein the second communication device includes a central location device and the plurality of first communication devices includes a plurality of remote subscribers.

12. The communications system of claim 9, wherein the first characteristic or the second characteristic includes a signal-to-noise ratio (SNR) or a codeword error rate.

13. The communications system of claim 9, further comprising:
an antenna configured to receive a bandwith request from the first device and to receive the first data transmission from the first device the first data transmission being in accordance with the first parameter associated with the first data code, wherein
the second communication device is further configured to grant the bandwidth request, the granted bandwidth being associated with the first data code, and to process the first data transmission using the first parameter associated with the first data code.

14. The communications system of claim 13, wherein the first parameter is independent of the second parameter of the second data transmission received from the second device.

15. The communications system of claim 13, wherein the first device is configured to determine, based on the first parameter, a number of mini-slots needed prior to granting the request.

16. The communications system of claim 9, wherein the first data code includes a modulation order and a forward error correction (FEC) parameter associated with the single channel.

17. The communications system of claim 9, wherein the plurality of data codes are data interval usage codes (IUCs) used in accordance with a Data Over Cable Service Interface Specification (DOCSIS).

18. The communications system of claim 9, wherein the second communication device is further configured to define the first and the second parameters to be associated with a plurality of interval data usage codes (IUCs).

19. A modulator in a communications system, the communications system including a plurality of first communication devices communicatively coupled to a second communication device via a single channel, the single channel being configured to allow transmission of data from the plurality of first communication devices to the second communication device using different data codes from among a plurality of data codes, comprising:

means for monitoring first and second characteristics respectively associated with first and second devices from among the plurality of first communication devices;

means for assigning first and second data codes from among the plurality of data codes to the first and the second devices according to the first and the second characteristics, the first and the second data codes being different with respect to each other and being respectively associated with first and second parameters;

means for receiving a first data transmission over the single channel from the first device in accordance with the first parameter and a second upstream data transmission over the single channel from the second device in accordance with the second parameter; and means for updating the first data code with a third data code from among the plurality of data codes when a variation is detected in the first characteristic.

20. The modulator of claim 19, wherein the first characteristic or the second characteristic includes a signal-to-noise ratio (SNR) or a codeword error rate.

21. The modulator of claim 19, further comprising:
means for receiving a bandwidth request from the first device;
means for granting the bandwidth request, the granted bandwidth being associated with the first data code;
means for receiving the first data transmission from the first device the first data transmission being in accordance with the first parameter associated with the first data code; and
means for processing the first data transmission using the first parameter associated with the first data code.

22. The modulator of claim 21, wherein the first parameter is independent of the second parameter of the second data transmission received from the second device.

23. The modulator of claim 21, further comprising:
means for determining, based on the first parameter, a number of mini-slots needed prior to the granting.

24. The modulator of claim 19, wherein the first data code includes a modulation order and a forward error correction (FEC) parameter associated with the single channel.

25. The modulator of claim 19, wherein the plurality of data codes are data interval usage codes (IUCs) used in accordance with a Data Over Cable Service Interface Specification (DOCSIS).

26. The modulator of claim 19, further comprising: means for defining the first and the second parameters to be associated with a plurality of data interval usage codes (IUCs).

27. A modulation method for use in a communications system, the communications system including a plurality of first communication devices communicatively coupled to a second communication device via a single channel, the single channel being configured to allow transmission of data from the plurality of first communication devices to the second communication device using different data codes from among a plurality of data codes, comprising:

monitoring, by the second communication device, first and second characteristics respectively associated with first and second devices from among the plurality of first communication devices;

assigning via a first message, by the second communication device, a first data code from among the plurality of data codes to the first device according to the first characteristic, the first data code being associated with a first burst parameter to be used by the first device during a first data transmission over the single channel;

assigning via a second message, by the second communication device, a second data code from among the plurality of data codes to the second device according to the second characteristic, the second data code being different with respect to the first data code and being associated with a second burst parameter to be used by the second device during a second data transmission over the single channel; and updating, by the communication device, the first data code or the second data code with a third data code from among the plurality of data codes when a variation is detected in the first or second characteristic.

\* \* \* \* \*

UNITED STATES PATENT AND TRADEMARK OFFICE
CERTIFICATE OF CORRECTION

PATENT NO. : 8,773,986 B2
APPLICATION NO. : 12/980137
DATED : July 8, 2014
INVENTOR(S) : Dale et al.

Page 1 of 1

It is certified that error appears in the above-identified patent and that said Letters Patent is hereby corrected as shown below:

In the Claims

Claim 13, column 12, line 28, please replace "the first device the first data transmission" with --the first device, the first data transmission--.

Signed and Sealed this
Thirtieth Day of September, 2014

Michelle K. Lee
*Deputy Director of the United States Patent and Trademark Office*